United States Patent
Klassen et al.

(10) Patent No.: US 9,689,334 B2
(45) Date of Patent: Jun. 27, 2017

(54) AIR INTAKE SYSTEM FOR AN OFF-ROAD VEHICLE

(71) Applicant: CNH Industrial America LLC, New Holland, PA (US)

(72) Inventors: Mark Douglas Klassen, Lockport, IL (US); Lorenzo Anthony Gomez, Schiller Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 251 days.

(21) Appl. No.: 14/542,222

(22) Filed: Nov. 14, 2014

(65) Prior Publication Data

US 2016/0138507 A1    May 19, 2016

(51) Int. Cl.
*F02D 41/18* (2006.01)
*F02M 35/16* (2006.01)
(Continued)

(52) U.S. Cl.
CPC .............. *F02D 41/18* (2013.01); *B01D 45/12* (2013.01); *B01D 50/002* (2013.01);
(Continued)

(58) Field of Classification Search
CPC ........ F02D 41/18; F02D 41/0002; F02D 9/02; F02D 2009/0225; F02M 35/164; F02M 35/0215; F02M 35/0204; F02M 35/0209; F02M 35/10255; F02M 35/262; F02M 35/0216; F02M 35/0205; F02M 35/0223;
(Continued)

(56) References Cited

U.S. PATENT DOCUMENTS

| 3,469,566 A | 9/1969 | Wilkinson et al. |
| 4,805,573 A | 2/1989 | MacFarlane et al. |

(Continued)

FOREIGN PATENT DOCUMENTS

| CN | 101905196 | 5/2012 |
| CN | 103047055 | 4/2013 |

(Continued)

OTHER PUBLICATIONS

Machine translation of CN103047055A, Zhang et al., originally published Apr. 13, 2013, pp. 18.*

(Continued)

*Primary Examiner* — Grant Moubry
(74) *Attorney, Agent, or Firm* — Rickard K. DeMille; Rebecca L. Henkel (57) ABSTRACT

An air intake system includes a pre-cleaner having a plurality of tubes configured to receive a flow of air, to filter particulate material from the flow of air, and to provide the flow of air to an engine of an off-road vehicle. The system also includes a controller configured to receive a first signal indicative of an air intake flow rate of the engine, to determine a target number of open tubes for the pre-cleaner based at least in part on the air intake flow rate and a desired air flow rate for each tube of the plurality of tubes, and to output a second signal to a component of the air intake system indicative of instructions to enable the flow of air to the target number of open tubes and to block the flow of air to the remainder of tubes of the plurality of tubes.

20 Claims, 6 Drawing Sheets

(51) Int. Cl.
*B01D 45/12* (2006.01)
*B01D 50/00* (2006.01)
*F02M 35/10* (2006.01)
*F02M 35/02* (2006.01)
*F02D 41/00* (2006.01)
*F02M 35/022* (2006.01)
*F02M 35/024* (2006.01)
*F02M 35/08* (2006.01)

(52) U.S. Cl.
CPC ..... *F02D 41/0002* (2013.01); *F02M 35/0204* (2013.01); *F02M 35/0205* (2013.01); *F02M 35/0209* (2013.01); *F02M 35/0215* (2013.01); *F02M 35/0223* (2013.01); *F02M 35/02416* (2013.01); *F02M 35/10255* (2013.01); *F02M 35/10262* (2013.01); *F02M 35/10386* (2013.01); *F02M 35/162* (2013.01); *F02M 35/164* (2013.01); *F02M 35/0216* (2013.01); *F02M 35/084* (2013.01); *Y02T 10/42* (2013.01)

(58) Field of Classification Search
CPC ........... F02M 35/10386; F02M 35/162; F02M 35/084; F02M 35/02461; B01D 50/002; B01D 45/12; B01D 45/14
USPC ...... 123/198 R, 198 E, 306, 184.21; 55/482, 55/484
See application file for complete search history.

(56) References Cited

U.S. PATENT DOCUMENTS

| | | | |
|---|---|---|---|
| 6,709,479 B1 | 3/2004 | Decker et al. | |
| 6,921,424 B2 | 7/2005 | Bugli et al. | |
| 7,364,601 B2 | 4/2008 | Xu et al. | |
| 7,674,308 B2* | 3/2010 | Krisko | B01D 45/16 55/498 |
| 7,682,413 B2 | 3/2010 | Sheidler | |
| 8,151,774 B2 | 4/2012 | McCauley et al. | |
| 8,177,872 B2 | 5/2012 | Nelson et al. | |
| 8,241,378 B2 | 8/2012 | Sullivan et al. | |
| 8,460,425 B2 | 6/2013 | Scott et al. | |
| 8,657,928 B2 | 2/2014 | Moredock et al. | |
| 8,683,970 B2* | 4/2014 | Chlystek | F02M 35/0226 123/184.21 |
| 2011/0296806 A1* | 12/2011 | Krisko | B01D 45/12 55/337 |
| 2012/0234168 A1 | 9/2012 | Tofsland et al. | |
| 2013/0025557 A1 | 1/2013 | Chlystek et al. | |
| 2013/0263744 A1 | 10/2013 | Osendorf et al. | |
| 2013/0327005 A1 | 12/2013 | Menssen et al. | |
| 2014/0144112 A1 | 5/2014 | Campbell et al. | |

FOREIGN PATENT DOCUMENTS

| | | | | |
|---|---|---|---|---|
| CN | 103047055 A | * | 4/2013 | ........... F02M 35/022 |
| DE | 102013004249 | | 9/2014 | |
| JP | 2006147317 | | 6/2006 | |
| WO | 2014077938 | | 5/2014 | |

OTHER PUBLICATIONS

European Search Report for European Application No. 15193883.4 dated May 20, 2016 (9 pages).

\* cited by examiner

AIR INTAKE SYSTEM FOR AN OFF-ROAD VEHICLE

BACKGROUND

The present application relates generally to air intake systems, and more specifically, to a pre-cleaner of an air intake system and methods for controlling air flow through the pre-cleaner of the air intake system.

Engines of many off-road vehicles, such as trucks, tractors, combines, and other specialized vehicles for use in various construction or agricultural applications, have significant air intake demands. In the challenging construction and agricultural environments in which such vehicles operate, dirt and dust may be present in relatively high concentrations. Accordingly, an air intake system having a series of filters is typically provided to filter incoming air upstream of the engine. Such air intake systems may include a pre-cleaner in series with a primary intake filter. The pre-cleaner may remove large particulate matter from the air, while the primary intake filter may remove finer particulate matter. However, the pre-cleaners of typical air intake systems for off-road vehicles may not suitably filter the incoming air. Accordingly, the primary intake filter of typical air intake systems may become clogged with debris, resulting in reduced air flow to the engine and impaired engine performance.

SUMMARY OF THE INVENTION

In one embodiment, an air intake system includes a pre-cleaner having a plurality of tubes configured to receive a flow of air, to filter particulate material from the flow of air, and to provide the flow of air to an engine of an off-road vehicle. The system also includes a controller configured to receive a first signal indicative of an air intake flow rate of the engine, to determine a target number of open tubes for the pre-cleaner of the air intake system based at least in part on the air intake flow rate of the engine and a desired air flow rate for each tube of the plurality of tubes. The controller is configured to output a second signal to a component of the air intake system indicative of instructions to enable the flow of air to the target number of open tubes and to block the flow of air to the remainder of tubes of the plurality of tubes.

In one embodiment, a method of operating an air intake system for an off-road vehicle includes receiving a first signal indicative of an air intake flow rate of an engine of the off-road vehicle at a processor. The method also includes determining, using the processor, a target number of open tubes for a pre-cleaner of the air intake system based at least in part on the air intake flow rate and a desired flow rate for each tube of a plurality of tubes of the pre-cleaner. The method further includes outputting, using the processor, a second signal to a component of the air intake system indicative of instructions to enable the flow of air to the target number of open tubes and to block the flow of air to the remainder of tubes of the plurality of tubes.

In one embodiment, an air intake system for an off-road vehicle includes a pre-cleaner having a plurality of tubes configured to receive a flow of air and to filter particulate material from the flow of air. The system also includes a cover disposed proximate to an upstream surface of the pre-cleaner and configured to move relative to the plurality of tubes to enable the flow of air to a target number of open tubes and to block the flow of air to the remainder of tubes of the plurality of tubes.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to air intake systems for off-road vehicles. Additionally, the embodiments disclosed herein relate to methods for controlling various components of an air intake system to adjust air flow through a pre-cleaner of the air intake system. The disclosed systems and methods provide effective debris filtering, thereby reducing clogs in the air intake system and enabling efficient engine performance. The air intake system may include an air inlet configured to receive unfiltered air from an environment. The unfiltered air may be directed through a debris separator (e.g., pre-cleaner) and one or more filters (e.g., intake filters) before being directed through an air outlet that routes the filtered air into an intake manifold of an engine, where the air may be combined with fuel for combustion. The pre-cleaner includes multiple discrete conduits (e.g., tubes) through which the air flows. Each tube of the pre-cleaner includes a separating device that is configured to create a spinning or centrifugal motion in the air flowing through the tube, thereby separating particulate matter (e.g., debris) from the air as the air flows through the tube. The separated debris is directed out of the air intake system via a debris conduit (e.g., the separated debris is aspirated or scavenged from the pre-cleaner via exhaust aspiration, cooling fan aspiration, electric aspiration, or the like), while the air is directed toward the intake filter and ultimately into the outlet, as noted above.

During operation of an off-road vehicle, an engine air intake flow rate varies over time. In typical air intake systems, a number of tubes of the pre-cleaner that are open to receiving the air flow does not change (e.g., all of the tubes are open to receiving the air flow and the air is distributed approximately evenly across all of the tubes). Thus, an air flow rate through each tube varies as the engine air intake flow rate changes. However, each tube has a peak efficiency for debris filtering. In particular, based on a diameter, a height, and/or an overall configuration of the tube, a particular air flow rate (e.g., or a range of air flow rates) results in the tube filtering out debris at peak efficiency. For example, if air flow through the tube is too low, the debris may not gain sufficient centrifugal force to reach the debris conduit. On the other hand, if air flow through the tube is too high, the debris may be pulled through the tube toward the intake filter.

Accordingly, the disclosed embodiments adjust the number of tubes open to receiving the air flow as the engine air intake flow rate changes. Such techniques control the air flow rate through each tube (e.g., by maintaining a desired air flow rate through each open tube), thereby facilitating improved debris filtering. More particularly, the disclosed embodiments may adjust the number of tubes open to receiving the air flow based at least in part on the engine air intake flow rate and the desired air flow rate for each tube. By way of example, in some embodiments, the desired air flow rate for each tube may be approximately 10 cubic feet per minute (cfm). In such cases, when the engine air intake flow rate is 600 cfm, the air intake system may provide 60 tubes open to receiving the air flow so that the air flow through each tube is approximately 10 cfm. However, when the engine air intake flow rate is 500 cfm, the air intake system may provide 50 tubes open to receiving the air flow so that the air flow through each tube is approximately 10 cfm. The above examples are provided merely to facilitate discussion, and it should be understood that the air intake system may include any number of tubes having any of a variety of desired air flow rates and may also be configured for use across a variety of engine air intake flow rates, as discussed in more detail below.

Additionally, as discussed in more detail below, any of a variety of components may be provided to enable adjustment of the number of tubes open to receiving the air flow. For example, a controller may be configured to receive data indicative of the engine air intake flow rate, to receive or to access the desired air flow rate for each tube, and to determine the target number of tubes open to receiving the air flow. In some cases, the controller may control an actuator (e.g., a hydraulic cylinder, a motor, or the like) to adjust a cover (e.g., layered shields) adjacent to the tubes. The cover may move between an open configuration in which all or most of the tubes are open to receiving the air flow, a closed configuration in which all or most of the tubes are closed to receiving the air flow (e.g., the cover covers the tubes, thereby blocking the flow of air through the tubes), or any position therebetween. Through such techniques, the air flow through each open tube may be maintained at approximately the desired air flow rate (e.g., or a range of air flow rates) that results in the tube filtering out debris at peak efficiency as the engine air intake flow rate varies. The disclosed embodiments provide effective filtering of debris, thereby reducing clogging of the intake filter and improving engine efficiency.

Figure 1:
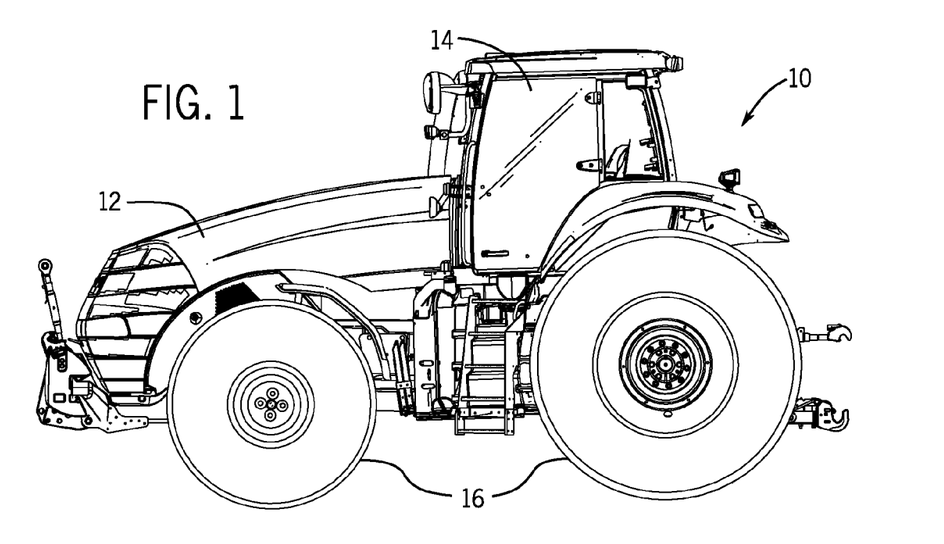
FIG. 1 is a perspective view of an embodiment of an off-road vehicle having an air intake system.

With the foregoing in mind, FIG. 1 is a perspective view of an embodiment of an off-road vehicle 10 having an air intake system. In the illustrated embodiment, the vehicle 10 is an agricultural tractor. However, any suitable off-road vehicle, including combines, trucks, and so forth, may utilize aspects of the disclosed embodiments. In the illustrated embodiment, the vehicle 10 includes a body 12 and a cabin 14 in which an operator may sit or stand to operate the vehicle 10. The body 12 may house an internal combustion engine, a transmission, and a power train for driving one or more wheels 16. It should be understood that in some vehicles such wheels 16 may be replaced with tracks or other drive systems. As discussed in more detail below, the vehicle includes an air intake system to provide filtered air for operation of the engine. Within the engine, a mixture of the air and a fuel are combusted to drive the vehicle 10.

Figure 2:
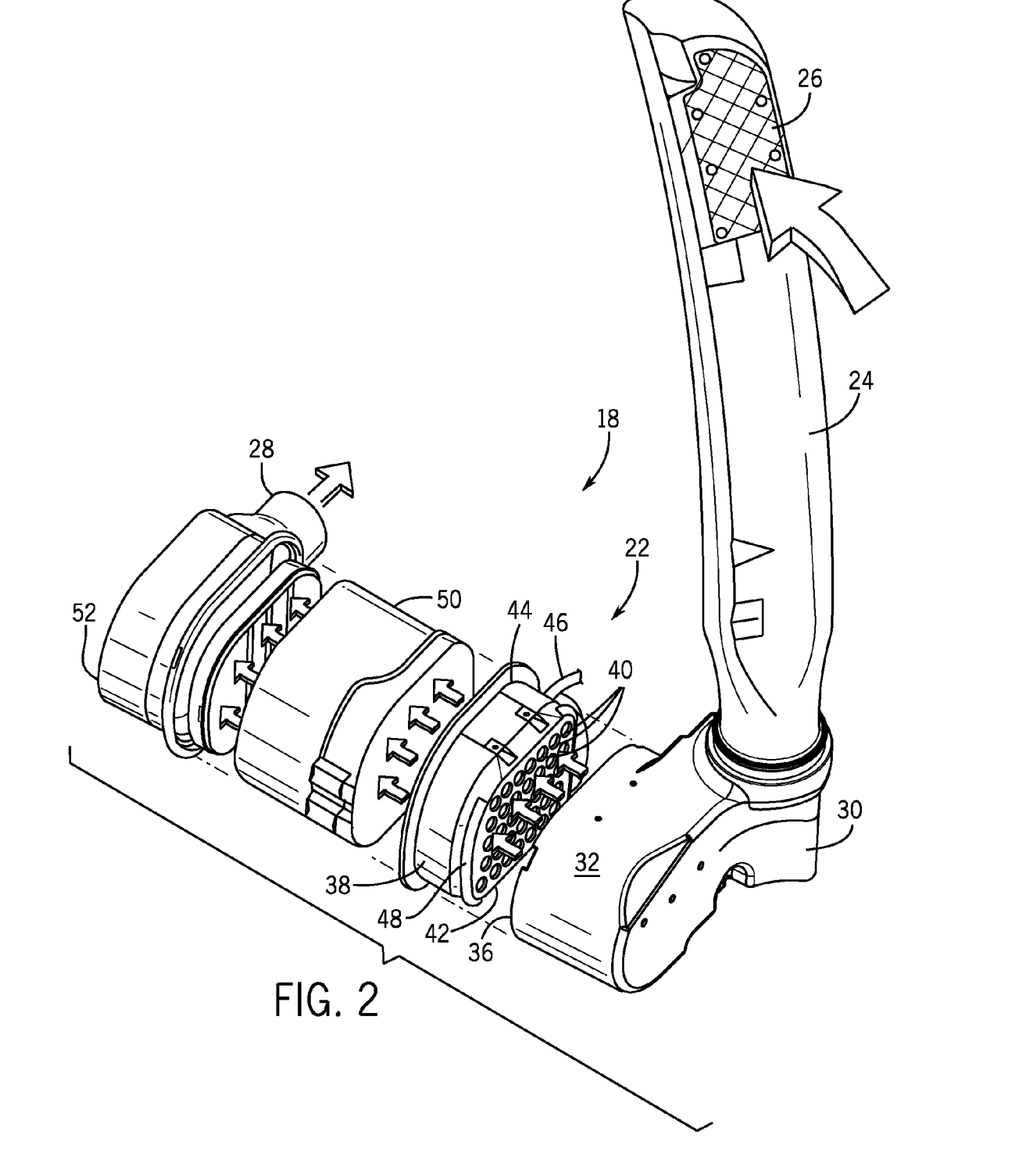
FIG. 2 is an exploded perspective view of an embodiment of an air intake system that may be employed in the off-road vehicle of FIG. 1.

FIG. 2 is an exploded perspective view of an embodiment of a portion of an air intake system 18 that may be used in the off-road vehicle 10. As shown, the air intake system 18 includes a filter assembly 22. An intake tubing 24 draws air through an opening or grill 26 and directs the air into the filter assembly 22. The filter assembly 22 may include various internal components for reducing particulate matter and debris from the air flow, for filtering finer matter, such as dust from the air, and for advancing the filtered air to an outlet tubing 28. As noted above, the outlet tubing 28 may route the filtered air into an intake manifold of the engine where it may be combined with fuel for combustion.

In the illustrated embodiment, the filter assembly 22 includes an inlet conduit 30 having a housing 32 that receives the air from the intake tubing 24. The inlet conduit 30 directs the air to a series of debris separating and filtering components, as illustrated. In particular, a pre-cleaner 38 (e.g., partitioned debris separator) is provided to remove or to filter particulate matter (e.g., debris) from the air. In the illustrated embodiment, the pre-cleaner 38 includes multiple conduits 40 (e.g., tubes) configured to receive the air. The inlet conduit 30 is configured to provide relatively even distribution of the air to the tubes 40 of the pre-cleaner 38 that are open to receiving the air. Each of the tubes 40 extends between a first surface 42 (e.g., upstream surface) and a second surface 44 (e.g., downstream surface) of the pre-cleaner 38. As discussed in more detail below, each of the tubes 40 may include a separating device configured to create a spinning or centrifugal motion in the air to separate the debris from the air. The debris separated by the pre-cleaner 38 may be discharged through a debris conduit 46. Additionally, the separated debris may be aspirated or scavenged through the debris conduit 46 of the pre-cleaner 38 via exhaust aspiration, cooling fan aspiration, electric aspiration, or the like.

As shown, the pre-cleaner 38 includes a cover 48 positioned proximate to the upstream surface 42 of the pre-cleaner 38. As discussed in more detail below, the cover 48 is configured to move across the upstream surface 42 of the pre-cleaner 38 to adjust a number of tubes 40 open to the air flow provided by the intake tubing 24. In particular, the cover 48 may move over a portion of the tubes 40, thereby covering the portion of the tubes 40 and adjusting the air flow rate through the remainder of the tubes 40 (e.g., uncovered tubes). As shown, the filter assembly 22 also includes a primary filter 50 (e.g., intake filter) downstream of the pre-cleaner 38, along with a secondary filter 52. The primary filter 50 and the secondary filter 52 further filter very small dust and other particles from the air, thereby generating sufficiently filtered air as the air travels toward the outlet tubing 28.

Figure 3:
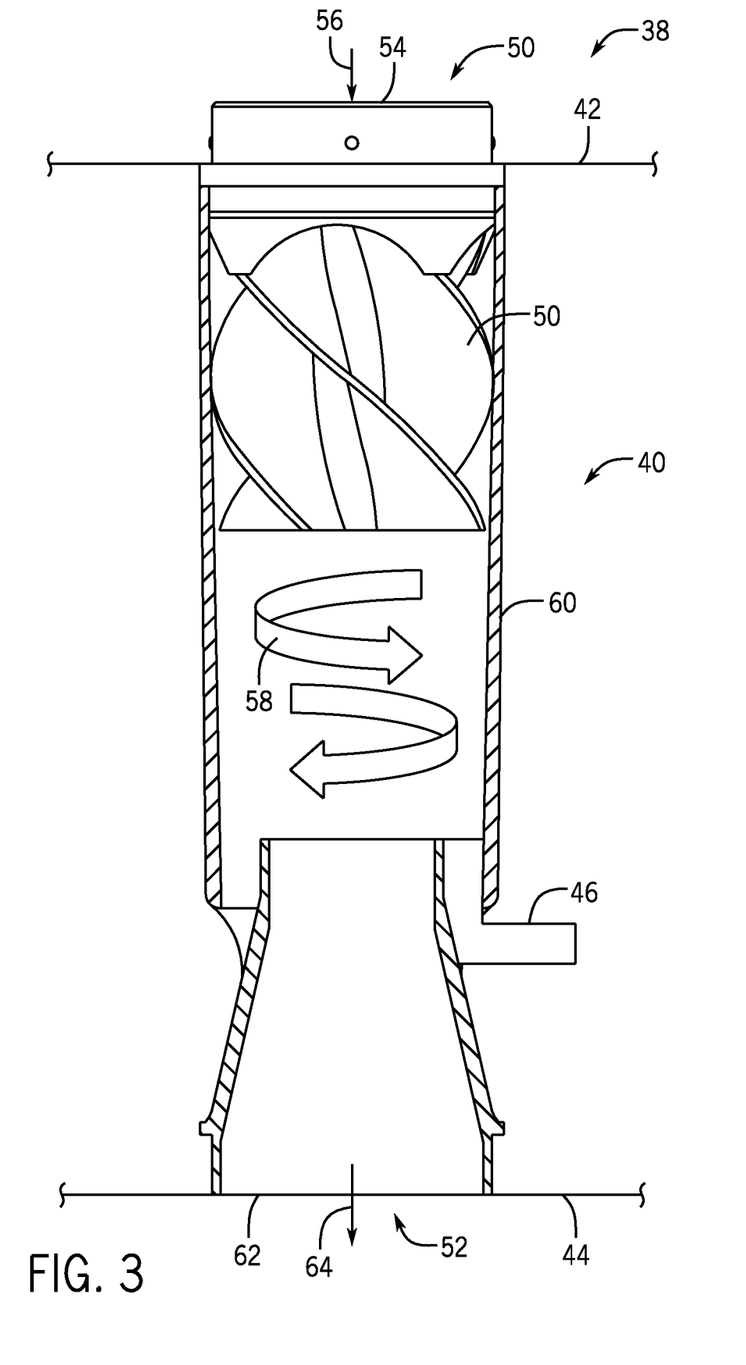
FIG. 3 is a cross-sectional side view of an embodiment of a tube of a pre-cleaner that may be employed within the air intake system of FIG. 2.

FIG. 3 is a cross-sectional side view of an embodiment of one tube 40 of the multiple tubes 40 of the pre-cleaner 38. As shown, the tube 40 has a first end 50 (e.g., upstream end) and a second end 52 (e.g., downstream end), and extends between the upstream surface 42 and the downstream surface 44 of the pre-cleaner 38. A first opening 54 (e.g., upstream opening) is configured to receive air, as shown by arrow 56. A separating device 50 is configured to create a spinning or centrifugal motion in the air to separate the debris from the air as the air travels through the tube 40, as shown by arrow 58. Thus, as the air travels through the tube 40, the debris is directed radially outward toward an outer wall 60 of the tube 40 and exits the tube 40 via the debris conduit 46. As noted above, an aspiration system (e.g., an exhaust aspiration system, cooling fan aspiration system, electric aspiration system, or the like) may aspirate or scavenge the pre-cleaner 38 to direct the debris through the debris conduit 46 and away from the pre-cleaner 38. The filtered air is directed out of a second opening 62 (e.g., downstream opening) of the tube 40, as shown by arrow 64. As discussed above with respect to FIG. 2, the cover 48 may be configured to move across the upstream surface 42 of the pre-cleaner 38 to cover the upstream opening 54 of one or more tubes 40, thereby blocking the flow of air through the one or more tubes 40.

Figure 4:
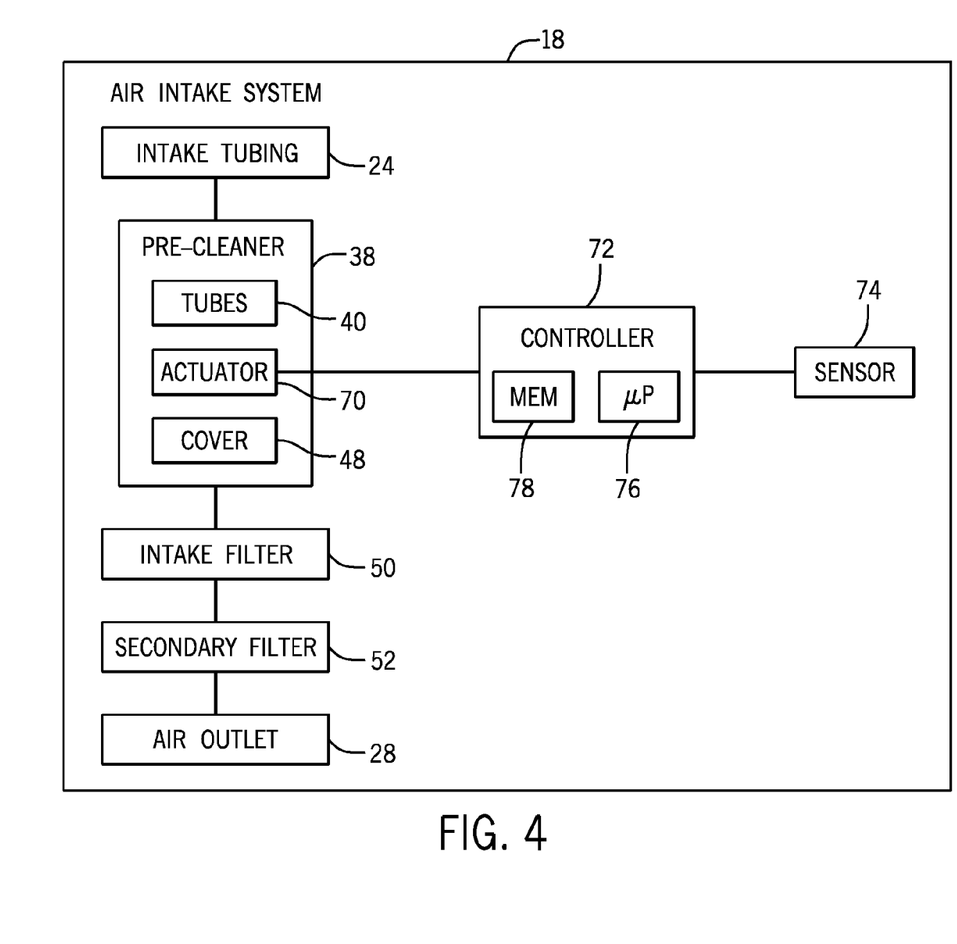
FIG. 4 is a schematic diagram of an embodiment of the air intake system of FIG. 2.

FIG. 4 is a schematic diagram of an embodiment of the air intake system 18. As shown, the air intake system 18 includes the intake tubing 24, the pre-cleaner 38, the intake filter 50, the secondary filter 52, and the outlet tubing 28. The pre-cleaner 38 includes the multiple tubes 40 and the cover 48. Additionally, the pre-cleaner 38 includes an actuator 70 (e.g., hydraulic cylinder, pneumatic cylinder, electric motor, or the like) that is configured to adjust a position of the cover 48 relative to the multiple tubes 40.

Additionally, in the illustrated embodiment, a controller 72 is provided to control the actuator 70 to adjust the position of the cover 48. In certain embodiments, the controller 72 is an electronic controller having electrical circuitry configured to process signals (e.g., signals indicative of an engine air intake flow rate) from one or more sensors 74 and/or from other components of the air intake system 18. For example, the sensors 74 are configured to output signals indicative of an engine air intake flow rate. In the illustrated embodiment, the controller 72 includes a processor, such as the illustrated microprocessor 76, and a memory device 78. The controller 72 may also include one or more storage devices and/or other suitable components. The processor 76 may be used to execute software, such as software for controlling the air intake system 18, the actuator 70, and so forth. Moreover, the processor 76 may include multiple microprocessors, one or more "general-purpose" microprocessors, one or more special-purpose microprocessors, and/or one or more application specific integrated circuits (ASICS), or some combination thereof. For example, the processor 76 may include one or more reduced instruction set (RISC) processors.

The memory device 78 may include a volatile memory, such as random access memory (RAM), and/or a nonvolatile memory, such as ROM. The memory device 78 may store a variety of information and may be used for various purposes. For example, the memory device 78 may store processor-executable instructions (e.g., firmware or software) for the processor 76 to execute, such as instructions for controlling the air intake system 18 and/or the actuator 70. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., a number of tubes 40 of the pre-cleaner 38, a desired air flow rate or a range of air flow rates for each tube 40 that enables the tubes 40 to filter debris with peak efficiency, or the like), instructions (e.g., software or firmware for controlling the air intake system 18, or the like), and any other suitable data.

The controller 72 may control the actuator 70 based on any of a variety of inputs or factors, including signals indicative of the engine air intake flow rate obtained by the sensor 74, a number of tubes 40 of the pre-cleaner 38, and/or a desired air flow rate or a range of air flow rates for the tubes 40 of the pre-cleaner 38. For example, the sensor 74 may monitor the engine air intake flow rate and provide a signal indicative of the engine air intake flow rate to the processor 76. Additionally, the processor 76 may receive a signal indicative of the number of tubes 40 of the pre-cleaner 38 and/or the desired air flow rate from any suitable source, such as the memory device 78. The processor 76 may be configured to determine a target number of open tubes 40 to achieve the desired air flow rate through each of the tubes 40. For example, the target number of tubes 40 may be approximately equal to the engine air intake flow rate divided by the desired air flow rate. Additionally, the processor 76 may be configured to provide a signal to the actuator 70 to adjust a position of the cover 48 to cover a portion of the tubes 40 such that the air flows through the remainder of the tubes 40 (e.g., the target number of tubes 40 or the uncovered or open tubes 40) at the desired air flow rate.

As discussed above, during operation of the vehicle 10, the engine air intake flow rate varies over time. Additionally, each tube 40 has a peak efficiency for debris filtering. In particular, based on a diameter, a height, and/or an overall configuration of the tube 40, there is a desired air flow rate (e.g., or a range of air flow rates) that results in the tube 40 filtering out debris with peak efficiency. Thus, debris filtering may be improved by adjusting the number of tubes 40 open to receiving the air flow as the engine air intake flow rate varies over time. In particular, the controller 72 may control the number of tubes 40 open to receiving the air flow based on the engine air intake flow rate (e.g., which may be received from the sensor 74) and the desired air flow rate for each tube 40 (e.g., which may be received from the memory device 78). By way of example, in some embodiments, the desired air flow rate for each tube 40 may be approximately 10 cubic feet per minute (cfm). In such cases, when the engine air intake flow rate is 600 cfm, the air intake system 18 may provide 60 tubes 40 open to receiving the air flow so that the air flow through each tube 40 is approximately 10 cfm. However, when the engine air intake flow rate changes to 500 cfm, the air intake system 18 may provide 50 tubes 40 open to receiving the air flow (e.g., by controlling the actuator 70 and adjusting the cover 48) so that the air flow through each tube 40 is maintained at approximately 10 cfm. The above examples are provided merely to facilitate discussion and it should be understood that the air intake system may include any number of tubes (e.g., between approximately 10-120, 20-100, 30-90, 40-80, or 50-70 tubes) having any of a variety of desired air flow rates (e.g., between approximately 1-50, 2-40, 3-30, 5-20 cfm) and may also be configured for use across a variety of engine air intake flow rates (e.g., between approximately 100-800, 130-750, 200-600, or 300-500 cfm).

Figure 5:
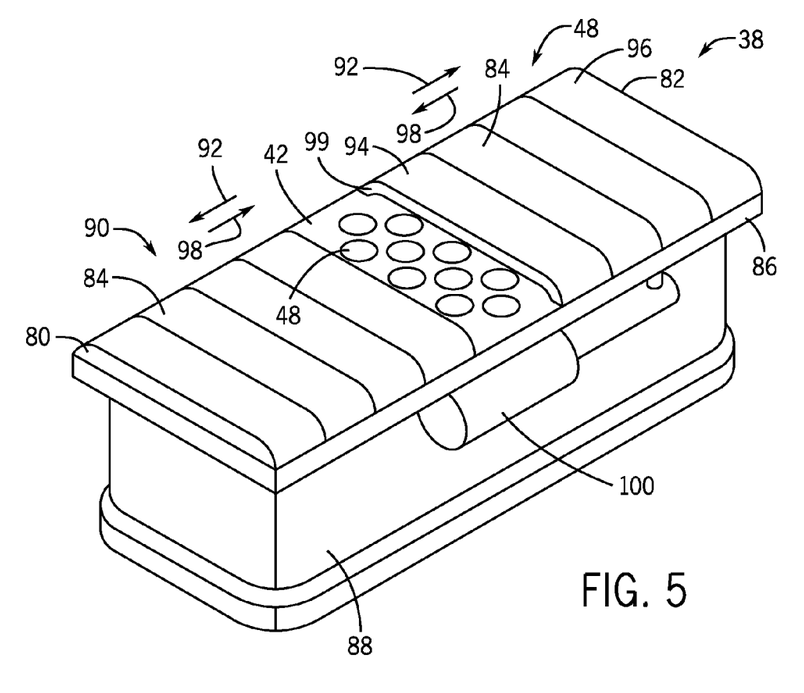
FIG. 5 is a perspective view of an embodiment of a pre-cleaner that may be employed within the air intake system of FIG. 2, the pre-cleaner having a cover with multiple layers.

FIG. 5 is a perspective view of an embodiment of the pre-cleaner 38 of the air intake system 18. As shown, the pre-cleaner 38 includes the tubes 40 and the cover 48. In the illustrated embodiment, the cover 48 includes a first portion 80 and a second portion 82 each having multiple layers 84 (e.g., layered shields). Adjacent layers 84 within the first portion 80 are coupled to one another, and adjacent layers 84 within the second portion 82 are coupled to one another. Each of the layers 84 may be slidingly supported by a track 86 (e.g., guide rail) positioned proximate to an outer wall 88 of the pre-cleaner 38. The layers 84 of the first portion 80 and the layers of the second portion 82 are configured to slide toward and away from one another to vary the number of tubes 40 open to the air flow. In the illustrated embodiment, the cover 48 is shown in a generally intermediate position 90 in which a portion of the tubes 40 are covered by the layers 84. As the first portion 80 and the second portion 82 of the cover 48 move in the direction of arrows 92 toward a generally open position in which most or all of the tubes 40 are open to the air flow, the layers 84 may stack upon one another, thereby exposing (e.g., uncovering) additional tubes 40. For example, a first layer 94 (e.g., inner layer) may move over a second layer 96 (e.g., outer layer). In other embodiments, the inner layer 94 may move under the outer layer 96. Additionally, as the cover 48 moves in the direction of arrow 98 toward a generally closed position in which most or all of the tubes 40 are closed to the air flow, the layers 84 may be removed from respective stacked positions, thereby covering additional tubes 40. For example, the inner layer 94 may move away from the outer layer 96.

In certain embodiments, a seal 99 (e.g., a rubber seal) may extend between the inner layer 94 and the upstream surface 42 of the pre-chamber 38. The seal 98 may be configured to block the air from flowing to the tubes 40 that are covered by the cover 48. In some embodiments, additional seals 99 may be provided between adjacent layers 84 of the cover 48. As shown, the actuator 70 is a hydraulic cylinder 100 configured to retract or to extend a piston rod to move the layers 84 of the cover 48. As discussed above, the actuator 70 may be controlled by the controller 72 based on the engine air intake flow rate as indicated by signals received by the sensor 74 and/or based on the desired air flow rate for the tubes 40 of the pre-cleaner 38. In particular, the actuator 70 may be controlled to move the layers 84 of the cover 48 such that a target number of tubes 40 remain open to the air flow. Through such techniques, the desired air flow rate for the tubes 40 is maintained through each of the open tubes 40, and the filtering efficacy of the pre-cleaner 38 is maintained as the engine air intake flow rate varies.

Figure 6:
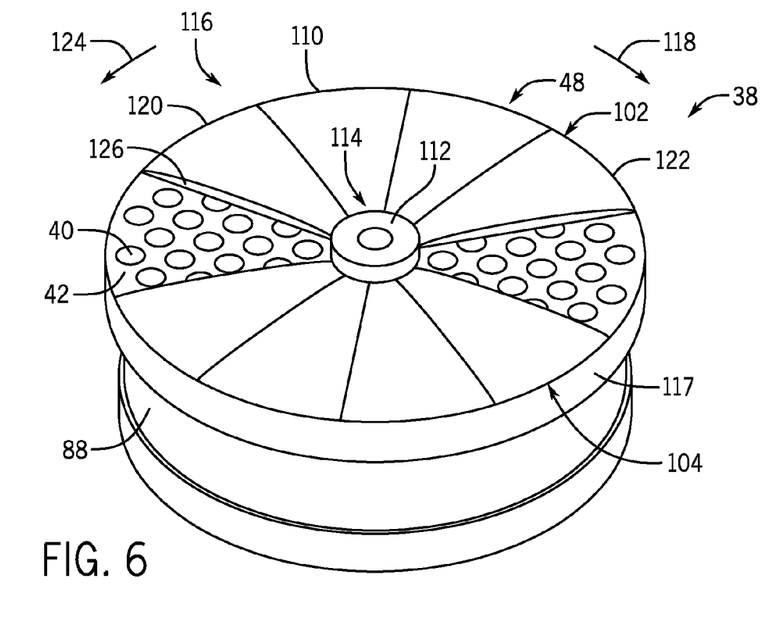
FIG. 6 is a perspective view of an embodiment of a pre-cleaner that may be employed within the air intake system of FIG. 2, the pre-cleaner having a cover with multiple radial layers.

FIG. 6 is a perspective view of another embodiment of the pre-cleaner 38. In the illustrated embodiment, the pre-cleaner 38 includes the tubes 40 and the cover 48. The cover 48 includes a first portion 102 and a second portion 104 each having multiple radial layers 110 (e.g., layered shields). Adjacent radial layers 110 within the first portion 102 are coupled to one another, and adjacent radial layers 110 within the second portion 104 are coupled to one another. Each of the radial layers 110 is supported by a motor assembly 112, which may be disposed in a central portion 114 of the pre-cleaner 38. Additionally, each of the radial layers 110 may be slidingly supported by a track 117, which may extend circumferentially about the outer wall 88 of the pre-cleaner 38. The cover 48 is shown in a generally intermediate position 116 in which a portion of the tubes 40 are covered by the radial layers 110. As noted above, the cover 48 may be adjusted to vary the number of tubes 40 open to the air flow. For example, the motor 112 may drive the radial layers 110 to rotate in the direction of arrow 118, thereby moving the radial layers 110 toward a generally open position in which most or all of the tubes 40 are open to the air flow. In particular, the radial layers 110 may stack upon one another, thereby exposing (e.g., uncovering) additional tubes 40. For example, a first radial layer 120 may move over a second radial layer 122. In other embodiments, the first radial layer 120 may move under the second radial layer 122. Additionally, as the cover 48 moves in the direction of arrow 124 toward a generally closed position in which most or all of the tubes 40 are closed to the air flow, the radial layers 110 may be removed from respective stacked positions, thereby covering additional tubes 40. For example, the first radial layer 120 may move away from the second radial layer 122.

In certain embodiments, a seal 126 (e.g., a rubber seal) may extend between one or both of the first radial layer 120 and the second radial layer 122 and the upstream surface 42 of the pre-cleaner 38. The seal 126 may be configured to block the air from flowing into the tubes 40 that are covered by the cover 48. In some embodiments, additional seals may be provided between adjacent radial layers 110 of the cover 48. As shown, the actuator is the motor 112, which is configured to adjust the position of the radial layers 110 of the cover 48. As discussed above, the motor 112 may be controlled by the controller 72 based on the engine air intake flow rate, as indicated by signals received from the sensor 74 and/or based on the desired air flow rate for the tubes 40 of the pre-cleaner 38. In particular, the motor 112 may be controlled to move the radial layers 110 of the cover 48 such that a target number of tubes 40 remain open to the air flow. Through such techniques, the desired air flow rate is maintained through each of the open tubes 40, and the filtering efficacy of the pre-cleaner 38 is maintained as the engine air intake flow rate varies.

Figure 7:
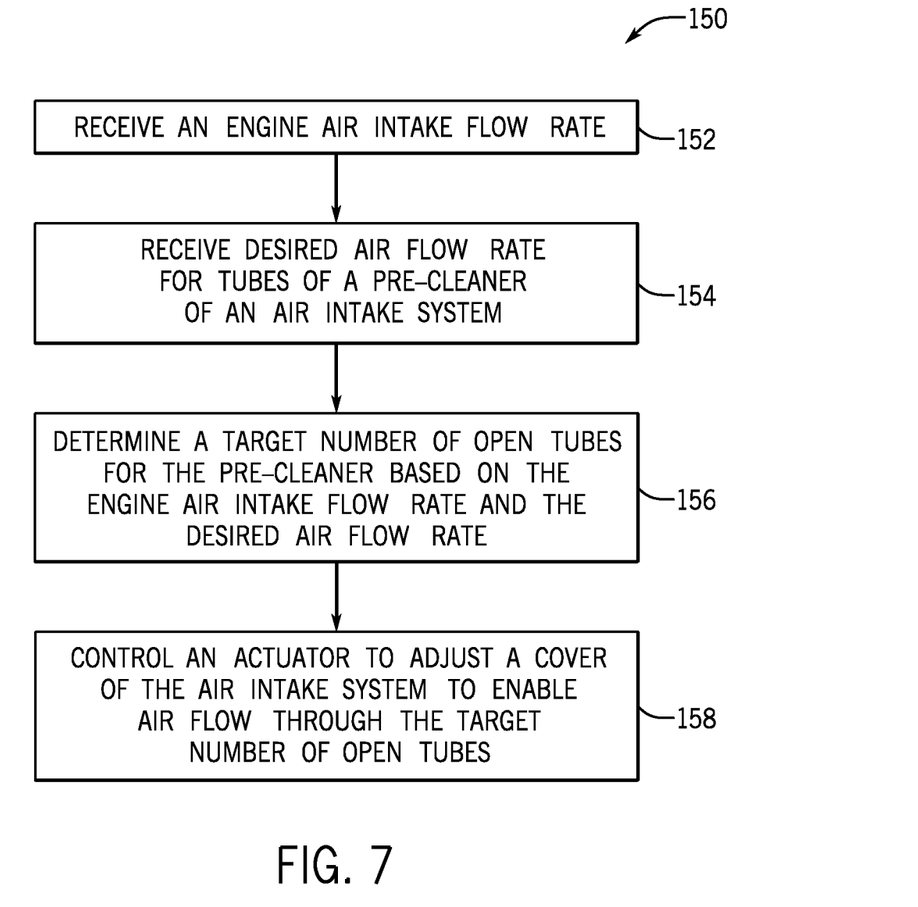
FIG. 7 is a flow diagram of an embodiment of a method for controlling air flow through the air intake system of FIG. 2.

FIG. 7 is a flow diagram of an embodiment of a method 150 for controlling air flow through the air intake system 18. As shown, the method 150 begins with receiving an engine air intake flow rate (block 152). As discussed above, the engine air intake flow rate may be obtained via the sensor 74, and signals indicative of the engine air intake flow rate may be provided to the processor 76 of the controller 72. The method 150 also includes receiving the desired air flow rate for each tube 40 of the pre-cleaner 38 (block 154). As discussed above, the desired air flow rate may be the air flow rate at which the tubes 40 of the pre-cleaner 38 effectively filter debris. The desired air flow rate may be stored in and received from the memory device 78 of the controller 72, or from any other suitable source.

The method also includes determining a target number of open tubes 40 for the pre-cleaner 38 based on the engine air intake flow rate and the desired air flow rate (block 156). As discussed above, the processor 76 may be configured to determine the target number of open tubes 40 by dividing the engine air intake flow rate by the desired air flow rate. The method further includes controlling the actuator 70, such as the hydraulic cylinder 100 or the motor 112, to adjust a position of the cover 48 (block 158). The cover 48 may be adjusted to enable the flow of air to the target number of open tubes 40 and to block air flow to the remaining tubes. As discussed above, the disclosed air intake system 18 and methods for adjusting various components of the air intake system 18 enable the air flow through each open tube 40 to be controlled to approximately the desired air flow rate that results in the tube 40 filtering out debris at peak efficiency as the engine air intake flow rate varies. The disclosed embodiments provide effective filtering of debris, thereby reducing clogging of the intake filter and improving engine efficiency.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An air intake system for an off-road vehicle, comprising:
   a pre-cleaner having a plurality of tubes configured to receive a flow of air, to filter particulate material from the flow of air, and to provide the flow of air to an engine of the off-road vehicle; and
   a controller configured to:
      receive a first signal indicative of an air intake flow rate of the engine of the off-road vehicle;
      determine a target number of open tubes for the pre-cleaner of the air intake system based at least in part on the air intake flow rate of the engine and a desired air flow rate for each tube of the plurality of tubes; and
      output a second signal to a component of the air intake system indicative of instructions to enable the flow of air to the target number of open tubes and to block the flow of air to the remainder of tubes of the plurality of tubes.

2. The air intake system of claim 1, wherein the component comprises a cover disposed proximate to an upstream surface of the pre-cleaner.

3. The air intake system of claim 2, comprising a seal extending between the cover and the upstream surface of the pre-cleaner.

4. The air intake system of claim 2, wherein the cover comprises layered radial shields configured to rotate about the pre-cleaner.

5. The air intake system of claim 2, wherein the cover comprises layered shields slidingly coupled to the pre-cleaner.

6. The air intake system of claim 5, wherein the layered shields are slidingly coupled to a track supported by an outer wall of the pre-cleaner.

7. The air intake system of claim 5, wherein the layered shields are configured to stack relative to one another.

8. The air intake system of claim 1, comprising an actuator configured to adjust the component of the pre-cleaner, wherein the controller is communicatively coupled to the actuator.

9. The air intake system of claim 8, wherein the actuator is one of a hydraulic cylinder, a pneumatic cylinder, or an electric motor.

10. A method of operating an air intake system for an off-road vehicle:
    receiving a first signal indicative of an air intake flow rate of an engine of the off-road vehicle at a processor;
    determining, using the processor, a target number of open tubes for a pre-cleaner of the air intake system based at least in part on the air intake flow rate and a desired flow rate for each tube of a plurality of tubes of the pre-cleaner; and
    outputting, using the processor, a second signal to a component of the air intake system indicative of instructions to enable the flow of air to the target number of open tubes and to block the flow of air to the remainder of tubes of the plurality of tubes.

11. The method of claim 10, comprising controlling, using the processor, an actuator to adjust a cover disposed adjacent to an upstream surface of the pre-cleaner to enable the flow of air to the target number of open tubes and to block the flow of air to the remainder of tubes of the plurality of tubes.

12. The method of claim 10, comprising controlling, using the processor, a motor to rotate layered radial shields relative to an upstream surface of the pre-cleaner to enable the flow of air to the target number of open tubes and to block the flow of air to the remainder of tubes of the plurality of tubes.

13. The method of claim 10, comprising receiving, using the processor, a third signal indicative of the desired flow rate for each tube of the plurality of tubes of the pre-cleaner from a memory device of the air intake system.

14. An air intake system for an off-road vehicle comprising:
    a pre-cleaner comprising a plurality of tubes configured to receive a flow of air and to filter particulate material from the flow of air; and
    a cover disposed proximate to an upstream surface of the pre-cleaner and configured to move relative to the plurality of tubes to enable the flow of air to a target number of open tubes and to block the flow of air to the remainder of tubes of the plurality of tubes,
    wherein the cover comprises layered shields configured to stack relative to one another.

15. The air intake system of claim 14, comprising an actuator configured to adjust a position of the cover relative to the plurality of tubes, wherein the actuator comprises a hydraulic cylinder, a pneumatic cylinder, or an electric motor.

16. The air intake system of claim 14, comprising a seal extending between the cover and the upstream surface of the pre-cleaner.

17. An air intake system for an off-road vehicle comprising:
    a pre-cleaner comprising a plurality of tubes configured to receive a flow of air and to filter particulate material from the flow of air;
    a cover disposed proximate to an upstream surface of the pre-cleaner and configured to move relative to the plurality of tubes to enable the flow of air to a target number of open tubes and to block the flow of air to the reminder of tubes of the plurality of tubes; and
    a controller configured to instruct an actuator to move the cover based at least in part on an air intake flow rate of an engine of the off-road vehicle and a desired air flow rate of each tube of the plurality of tubes.

18. An air intake system for an off-road vehicle comprising:
    a pre-cleaner comprising a plurality of tubes configured to receive a flow of air and to filter particulate material from the flow of air; and
    a cover disposed proximate to an upstream surface of the pre-cleanser and configured to move relative to the plurality of tubes to enable the flow of air to a target number of open tubes and to block the flow of air to the remainder of tubes of the plurality of tubes, wherein the cover comprises layered shields slidingly coupled to a track supported by an outer wall of the pre-cleaner.

19. An air intake system of for an off-road vehicle comprising:
- a pre-cleaner comprising a plurality of tubes configured to receive a flow of air and to filter particulate material from the flow of air; and
- a cover disposed proximate to an upstream surface of the pre-cleaner and configured to move relative to the plurality of tubes to enable the flow of air to a target number of open tubes and to block the flow of air to the remainder of tubes of the plurality of tubes,
- wherein the cover comprises layered radial shields extending radially outward from a center portion of the pre-cleaner to an outer wall of the pre-cleaner.

20. The air intake system of claim 19, wherein the cover comprises layered shields configured to stack relative to one another.

* * * * *